United States Patent

Tauchi

[11] Patent Number: 5,850,263
[45] Date of Patent: *Dec. 15, 1998

[54] VIDEO SIGNAL PROCESSING APPARATUS FOR CONVERTING A FRAME VIDEO SIGNAL REPRESENTING A PLURALITY OF VIDEO FRAMES INTO A FIELD SIGNAL REPRESENTING A PLURALITY OF VIDEO FIELDS

[75] Inventor: Yoichiro Tauchi, Saitama, Japan

[73] Assignee: Sony Corporation, Tokyo, Japan

[*] Notice: The term of this patent shall not extend beyond the expiration date of Pat. No. 5,754,247.

[21] Appl. No.: 895,440

[22] Filed: Jul. 16, 1997

Related U.S. Application Data

[62] Division of Ser. No. 539,118, Oct. 4, 1995.

[30] Foreign Application Priority Data

Oct. 5, 1994 [JP] Japan ...................................... 6-266315

[51] Int. Cl.⁶ .................................................. H04N 7/01
[52] U.S. Cl. .......................... 348/459; 348/447; 348/910; 386/131
[58] Field of Search ..................................... 348/446, 447, 348/459, 441, 607, 910, 714, 718, 716; 386/85, 131

[56] References Cited

U.S. PATENT DOCUMENTS

| | | | |
|---|---|---|---|
| 4,701,793 | 10/1987 | den Hollander et al. | 348/447 |
| 5,115,311 | 5/1992 | Jaqua | 348/459 |
| 5,182,643 | 1/1993 | Futscher | 348/447 |
| 5,353,119 | 10/1994 | Dorricott et al. | 348/446 |
| 5,455,628 | 10/1995 | Bishop | 348/446 |
| 5,510,843 | 4/1996 | Keene et al. | 348/447 |

Primary Examiner—Victor R. Kostak
Attorney, Agent, or Firm—Frommer Lawrence & Haug, LLP; William S. Frommer; Dennis M. Smid

[57] ABSTRACT

A video signal processing apparatus and method for converting a frame-unit video signal into a field-unit video signal. The apparatus includes a memory for storing the frame-unit video signal, a control circuit for controlling reading of the stored frame-unit video data from the memory so as to obtain the field-unit video signal having fields which are arranged in a desired order, and a vertical filter which receives the field-unit video signal read from the memory. The vertical filter shifts a centroid of a picture represented by the received video signal in accordance with at least one coefficient which is selectively set based upon the field order. The reading of the video signal may be controlled so as to operate as a delay device thereby eliminating the need for such delay device in the vertical filter. When applied to a digital VTR or the like, the present apparatus prevents line flicker and suppresses plane flicker.

8 Claims, 23 Drawing Sheets

FIG. 2

| VFF | VFS | OUTPUT FIELDS |
|-----|-----|---------------|
| H | H | FIRST FIELD AND SECOND FIELD OUTPUTTED IN THIS ORDER |
| H | L | SECOND FIELD AND FIRST FIELD OUTPUTTED IN THIS ORDER |
| L | H | FIRST FIELD OUTPUTTED TWICE |
| L | L | SECOND FIELD OUTPUTTED TWICE |

FIG. 12

| | VFF | VFS | FLID | CONT | DLY | CONTENTS |
|---|---|---|---|---|---|---|
| (1) | L | L | L | L | L | SECOND FIELD PICTURE OUTPUTTED AS SECOND FIELD |
| (2) | L | L | H | H | L | SECOND FIELD PICTURE OUTPUTTED AS FIRST FIELD |
| (3) | L | H | L | H | H | FIRST FIELD PICTURE OUTPUTTED AS SECOND FIELD |
| (4) | L | H | H | L | L | FIRST FIELD PICTURE OUTPUTTED AS FIRST FIELD |
| (5) | H | L | L | H | H | FIRST FIELD PICTURE OUTPUTTED AS SECOND FIELD |
| (6) | H | L | H | H | L | SECOND FIELD PICTURE OUTPUTTED AS FIRST FIELD |
| (7) | H | H | L | L | L | SECOND FIELD PICTURE OUTPUTTED AS SECOND FIELD |
| (8) | H | H | H | L | L | FIRST FIELD PICTURE OUTPUTTED AS FIRST FIELD |

FLID { H : FIRST FIELD
       L : SECOND FIELD

FIG. 15

| SFON | VFF | VFS | FLID | CONT | DLY |
|------|-----|-----|------|------|-----|
| H | L | L | L | L | L |
| H | L | L | H | H | L |
| H | L | H | L | H | H |
| H | L | H | H | L | L |
| H | H | L | L | H | H |
| H | H | L | H | H | L |
| H | H | H | L | L | L |
| H | H | H | H | L | L |
| L | L | L | L | L | H |
| L | L | L | H | H | H |
| L | L | H | L | H | H |
| L | L | H | H | L | H |
| L | H | L | L | H | H |
| L | H | L | H | H | H |
| L | H | H | L | L | H |
| L | H | H | H | L | H |

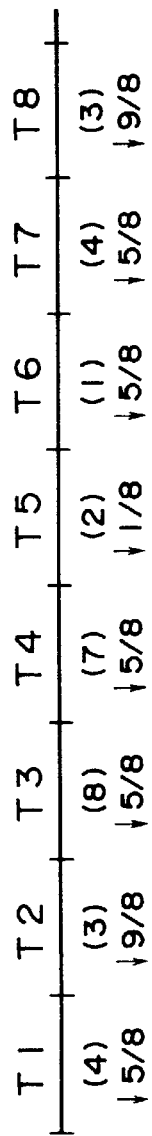

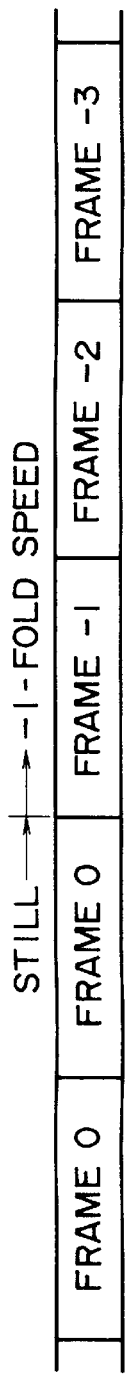
FIG. 17a INPUT SIGNAL OF DEBLOCKING-DESHUFFLING CIRCUIT
FIG. 17b OUTPUT SIGNAL OF DEBLOCKING-DESHUFFLING CIRCUIT
FIG. 17c FLID
FIG. 17d VFS
FIG. 17e VFF
FIG. 17f CONTROL LOGIC AND SHIFT OF CENTROID

F I G. 19

| | VFF | VFS | FLID | SFON | K1 | K2 | K3 | OUTPUT CHARACTERISTICS | SHIFTS OF CENTROID | CONTENTS |
|---|---|---|---|---|---|---|---|---|---|---|
| (1) | L | L | L | H | 1/4 | 3/4 | 0 | 1/4Y+3/4DY | DOWN BY 3/4 LINE | SECOND FIELD PICTURE OUTPUTTED AS SECOND FIELD |
| (2) | L | L | H | H | 3/4 | 1/4 | 0 | 3/4Y+1/4DY | DOWN BY 1/4 LINE | SECOND FIELD PICTURE OUTPUTTED AS FIRST FIELD |
| (3) | L | H | L | H | 0 | 3/4 | 1/4 | 3/4DY+1/4D²Y | DOWN BY 5/4 LINE | FIRST FIELD PICTURE OUTPUTTED AS SECOND FIELD |
| (4) | L | H | H | H | 1/4 | 3/4 | 0 | 1/4Y+3/4DY | DOWN BY 3/4 LINE | FIRST FIELD PICTURE OUTPUTTED AS FIRST FIELD |
| (5) | H | L | L | H | 0 | 3/4 | 1/4 | 3/4DY+1/4D²Y | DOWN BY 5/4 LINE | FIRST FIELD PICTURE OUTPUTTED AS SECOND FIELD |
| (6) | H | L | H | H | 3/4 | 1/4 | 0 | 3/4Y+1/4DY | DOWN BY 1/4 LINE | FIRST FIELD PICTURE OUTPUTTED AS FIRST FIELD |
| (7) | H | H | L | H | 1/4 | 3/4 | 0 | 1/4Y+3/4DY | DOWN BY 3/4 LINE | SECOND FIELD PICTURE OUTPUTTED AS SECOND FIELD |
| (8) | H | H | H | H | 1/4 | 3/4 | 0 | 1/4Y+3/4DY | DOWN BY 3/4 LINE | FIRST FIELD PICTURE OUTPUTTED AS FIRST FIELD |
| (9) | X | X | X | L | 0 | 1 | 0 | DY | DOWN BY 1 LINE | OUTPUTTED AS IT IS WITH DELAY OF 1 LINE |

FIG. 20

| | VFF | VFS | FLID | SFON | K1 | K2 | K3 | OUTPUT CHARACTERISTICS | SHIFTS OF CENTROID | CONTENTS |
|---|---|---|---|---|---|---|---|---|---|---|
| (1) | L | L | L | H | 3/8 | 5/8 | 0 | $3/8Y + 5/8DY$ | DOWN BY 5/8 LINE | SECOND FIELD PICTURE OUTPUTTED AS SECOND FIELD |
| (2) | L | L | H | H | 7/8 | 1/8 | 0 | $7/8Y + 5/8DY$ | DOWN BY 1/8 LINE | SECOND FIELD PICTURE OUTPUTTED AS FIRST FIELD |
| (3) | L | H | L | H | 0 | 7/8 | 1/8 | $7/8DY + 1/8D^2Y$ | DOWN BY 9/8 LINE | FIRST FIELD PICTURE OUTPUTTED AS SECOND FIELD |
| (4) | L | H | H | H | 3/8 | 5/8 | 0 | $3/8Y + 5/8DY$ | DOWN BY 5/8 LINE | FIRST FIELD PICTURE OUTPUTTED AS FIRST FIELD |
| (5) | H | L | L | H | 0 | 7/8 | 1/8 | $7/8DY + 1/8D^2Y$ | DOWN BY 9/8 LINE | FIRST FIELD PICTURE OUTPUTTED AS SECOND FIELD |
| (6) | H | L | H | H | 7/8 | 1/8 | 0 | $7/8Y + 5/8DY$ | DOWN BY 1/8 LINE | SECOND FIELD PICTURE OUTPUTTED AS FIRST FIELD |
| (7) | H | H | L | H | 3/8 | 5/8 | 0 | $3/8Y + 5/8DY$ | DOWN BY 5/8 LINE | SECOND FIELD PICTURE OUTPUTTED AS SECOND FIELD |
| (8) | H | H | H | H | 3/8 | 5/8 | 0 | $3/8Y + 5/8DY$ | DOWN BY 5/8 LINE | FIRST FIELD PICTURE OUTPUTTED AS FIRST FIELD |
| (9) | X | X | X | L | 0 | 1 | 0 | $DY$ | DOWN BY 1 LINE | OUTPUTTED AS IT IS WITH DELAY OF 1 LINE |

FIG. 21

| | VFF | VFS | FLID | SFON | K1 | K2 | K3 | OUTPUT CHARACTERISTICS | SHIFTS OF CENTROID | CONTENTS |
|---|---|---|---|---|---|---|---|---|---|---|
| (1) | L | L | L | H | 1/8 | 7/8 | 0 | $1/8Y + 7/8DY$ | DOWN BY 7/8 LINE | SECOND FIELD PICTURE OUTPUTTED AS SECOND FIELD |
| (2) | L | L | H | H | 5/8 | 3/8 | 0 | $5/8Y + 3/8DY$ | DOWN BY 3/8 LINE | SECOND FIELD PICTURE OUTPUTTED AS FIRST FIELD |
| (3) | L | H | L | H | 0 | 5/8 | 3/8 | $5/8DY + 3/8D^2Y$ | DOWN BY 11/8 LINE | FIRST FIELD PICTURE OUTPUTTED AS SECOND FIELD |
| (4) | L | H | H | H | 1/8 | 7/8 | 0 | $1/8Y + 7/8DY$ | DOWN BY 7/8 LINE | FIRST FIELD PICTURE OUTPUTTED AS FIRST FIELD |
| (5) | H | L | L | H | 0 | 5/8 | 3/8 | $5/8DY + 3/8D^2Y$ | DOWN BY 11/8 LINE | FIRST FIELD PICTURE OUTPUTTED AS SECOND FIELD |
| (6) | H | L | H | H | 5/8 | 3/8 | 0 | $5/8Y + 3/8DY$ | DOWN BY 3/8 LINE | SECOND FIELD PICTURE OUTPUTTED AS FIRST FIELD |
| (7) | H | H | L | H | 1/8 | 7/8 | 0 | $1/8Y + 7/8DY$ | DOWN BY 7/8 LINE | SECOND FIELD PICTURE OUTPUTTED AS SECOND FIELD |
| (8) | H | H | H | H | 1/8 | 7/8 | 0 | $1/8Y + 7/8DY$ | DOWN BY 7/8 LINE | FIRST FIELD PICTURE OUTPUTTED AS FIRST FIELD |
| (9) | X | X | X | L | 0 | 1 | 0 | $DY$ | DOWN BY 1 LINE | OUTPUTTED AS IT IS WITH DELAY OF 1 LINE |

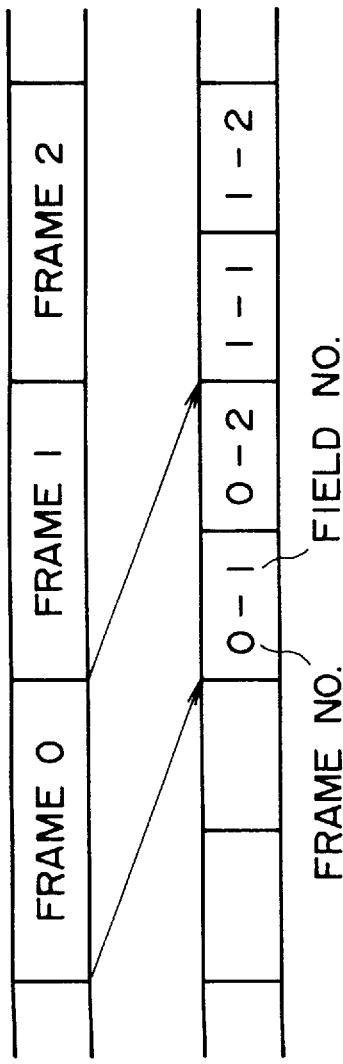
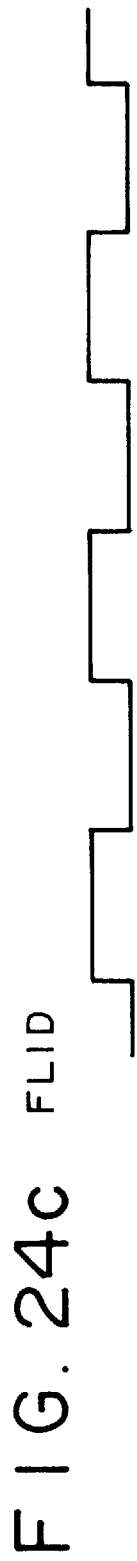
F I G. 24a INPUT SIGNAL OF DEBLOCKING-DESHUFFLING CIRCUIT
F I G. 24b OUTPUT SIGNAL OF DEBLOCKING-DESHUFFLING CIRCUIT
F I G. 24c FLID

VIDEO SIGNAL PROCESSING APPARATUS FOR CONVERTING A FRAME VIDEO SIGNAL REPRESENTING A PLURALITY OF VIDEO FRAMES INTO A FIELD SIGNAL REPRESENTING A PLURALITY OF VIDEO FIELDS

This application is a division of application Ser. No. 08/539,118, filed Oct. 4, 1995.

BACKGROUND OF THE INVENTION

The present invention relates to a technique for suppressing flicker produced during variable-speed reproduction by a digital video tape recorder or the like.

A digital video tape recorder (hereinafter, a digital VTR) has been proposed for recording and/or reproducing video signals which utilizes analog-to-digital conversion and subsequent data compression. FIG. 22 illustrates an example of such a digital VTR.

As shown in FIG. 22, a digital VTR 99 generally includes analog-to-digital (A-D) converters 1–3, a blocking shuffling circuit 4, a picture compression encoder 5, an error correction code adder 6, a modulator 7, a demodulator 13, an error corrector 14, a picture compression decoder 15, a deblocking-deshuffling circuit 16, and digital-to-analog (D-A) converters 17–19. The recording mode of the digital VTR 99 will be initially described below, afterwhich the reproducing mode of the digital VTR will be described.

In the recording mode, analog component video signals composed of a luminance signal Y and color difference signals U (B-Y) and V (R-Y) are respectively supplied to the A-D converters 1–3 so as to be converted therein into digital signals which are supplied to the blocking-shuffling circuit 4. From such converted digital output signals, the blocking-shuffling circuit 4 receives picture data in an effective area. (For example, an effective area or effective scanning period in the NTSC or the 525/60 system is the 240 lines from lines 23H to 262H in a first field and the 240 lines from lines 285H to 524H in a second field. On the other hand, in the PAL or 625/50 system, the effective scanning period is the 288 lines from lines 23H to 310H in a first field and the 288 lines from lines 335H to 622H in a second field.) FIG. 23 illustrates the relationship between scanning lines in an effective area and an image plane thereof for the 525/60 system. The blocking-shuffling circuit 4 converts the received field-unit (interlaced) component picture data into frame-unit (non-interlaced) time division picture data which may be shuffled to enhance the data compression efficiency. Thereafter, such picture data is supplied to the picture compression encoder 5.

The picture data received from the blocking-shuffling circuit 4 is compressed by the picture compression encoder 5 by use of discrete cosine transform (DCT) and variable-length encoding. Such compressed data is supplied to the error correction code adder 6, whereupon an error correction code is added to the compressed data. Such error correction code may be utilized for correcting an error produced during reproduction. An output data signal from the error correction code adder 6 is supplied to the modulator 7 which processes the received data in accordance with a predetermined recording modulation. A modulated data signal from the modulator 7 is supplied through a recording amplifier 8 to a recording head 9 so as to be recorded on a video tape 10.

In the reproduction mode, data is reproduced from the video tape 10 by a reproducing head 11 and amplified by a reproduction amplifier 12 and thereafter supplied to the demodulator 13. The demodulator 13 demodulates the received data in a manner substantially opposite to that performed by the modulator 7 and supplies the demodulated data to the error corrector 14, whereupon an error correction operation is performed by using the error correction code added in the recording mode. The corrected data is supplied to the picture compression decoder 15 which processes the received data by use of variable-length decoding and inverse discrete cosine transform (IDCT) techniques in a manner substantially opposite to that performed by the picture compression encoder 5. An output signal from the picture compression decoder 15 is supplied to the deblocking-deshuffling circuit 16.

The deblocking-deshuffling circuit 16 deshuffles the received data so as to restore the original arrangement of the data (that is, the data arrangement prior to being shuffled in the recording section) and deblocks the frame-unit time division picture data so as to form the original field-unit component picture data (that is, the field-unit component picture data supplied to the blocking-shuffling circuit 4). Output signals from the deblocking-deshuffling circuit 16 are supplied to D-A converters 17–19. FIG. 24 illustrates the timing relationship between the input and output signals of the deblocking-deshuffling circuit 16 for a normal reproduction mode. More specifically, the input data signal to the deblocking-deshuffling circuit 16 is illustrated in FIG. 24a, and the data signal outputted therefrom is illustrated in FIG. 24b. As shown therein, the input picture data of each frame is outputted as picture data of two- fields with a delay of one frame. As is to be appreciated, although data corresponding to only one output picture data signal is shown, three sets of data corresponding to Y, U and V may be outputted in parallel.

The D-A converters 17–19 convert the received data signals to analog form. Further, the converters 17–19 may add to such signals a synchronizing signal and other such signals which, for example, may be obtained from a reference signal generator (not shown). Analog component video signals Y, U and V are respectively supplied from the D-A converters 17–19.

In the above-described digital VTR, variable-speed reproduction may be performed by successively outputting picture data of one field with the use of a memory which may be utilized to store the picture data in the deblocking-deshuffling circuit 16. As an example, in a still reproduction mode, picture data of either field within a frame may be outputted twice within one frame. However, as is apparent from FIG. 23 which illustrates the relationship between an image plane and scanning lines, picture data of one field is offset from that of the other field within a frame by an amount corresponding to one-half of a line interval. As a result, in the above example, although the picture data of either field is outputted twice within one frame, such same picture data is outputted during one field period at a position different by one half of a line interval from that of the other field period. Such situation produces line flicker at the field frequency. As a result, the picture is vibrated vertically with an amplitude corresponding to one half of a line interval.

Additionally, line flicker may occur in a picture formed by selectively switching between a picture produced by successively outputting the first fields and a picture produced by successively outputting the second fields. That is, in this situation, a vertical positional deviation exists between the two types of pictures which corresponds to one half of a line interval.

Further, so-called plane flicker may occur when a frame formed of first and second fields is inserted between frames formed of successive first or second fields. In other words, plane flicker may occur when a picture having a vertically high resolution is inserted between pictures having a vertically low resolution due to fluctuations of the vertical resolution.

The above-described flicker may be suppressed or eliminated by selectively adjusting the respective centroids of the pictures of two fields. Accordingly, it is desirable to have a video signal processing apparatus which is adapted to selectively adjust the respective field centroids so as to eliminate or minimize line flicker and eliminate or suppress plane flicker.

OBJECTS AND SUMMARY OF THE INVENTION

An object of the present invention is to provide a video signal processing technique which selectively adjusts centroids of respective fields so as to prevent or minimize line flicker and suppress plane flicker during a variable-speed reproduction mode in a digital VTR or the like.

More specifically, it is an object of the present invention to provide a video signal processing technique as aforesaid which utilizes a video signal converter for converting an input frame-unit video signal into a field-unit video signal and a vertical filter for filtering an output video signal of the video signal converter, wherein the video signal converter executes write/read control of a storage device so as to control the field order of the output video signal in accordance with a desired order and wherein a coefficient or coefficients of the vertical filter may be selectively changed in accordance with the field order of the output video signal of the video signal converter.

Another object of the present invention is to provide a video signal processing technique as aforesaid which enables the storage device to have a storage capacity which is less than that normally used.

A further object of the present invention is to provide a video signal processing technique as aforesaid in which the timing for the reading of the storage device is controlled in such a manner so as to eliminate a delay device which may otherwise be utilized in the vertical filter.

In accordance with an aspect of the present invention, a video signal processing apparatus for converting a frame video signal representing a plurality of video frames into a field video signal representing a plurality of video fields is provided. The apparatus comprises a memory device for storing the frame video signal and for reading out the stored video signal as the field video signal; a control device for controlling the order in which the fields of the field video signal are read from the memory device so as to arrange the fields in a desired order; and a vertical filter for receiving the field video signal read out from the memory means and for vertically shifting a centroid of a picture represented by the received field video signal in accordance with a coefficient selectively set based upon the field order.

In accordance with another aspect of the present invention, a video signal processing apparatus for converting a frame video signal representing a plurality of video frames into a field video signal representing a plurality of video fields is provided. The apparatus comprises a memory device for storing the frame video signal and for reading out the stored video signal as the field video signal. The memory device has a data storage capacity smaller than an amount of data of one frame but larger than an amount of data of one field. The apparatus further comprises a control device for controlling the order in which the fields of the field video signal are read from the memory device so as to arrange the fields in a desired order.

According to the present video signal processing technique, the write/read of data into/from the storage device is controlled such that an input frame-unit video signal is converted into a field-unit video signal having a desired field order, and a coefficient or coefficients are selectively changed in the vertical filter in accordance with such field order to change the filtering characteristic so as to prevent line flicker and to suppress plane flicker during variable-speed reproduction.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIG. 2 is a table which illustrates the relationship between control signals VFF, VFS and output fields;

FIG. 12 is a truth table illustrating values of output signals as a function of input signals for a control logic circuit of the vertical filter of FIG. 11;

FIG. 15 is a truth table illustrating values of output signals as a function of input signals for the control logic circuit of FIG. 13;

FIGS. 16a to 16f are diagrams illustrating timing of signals and the amount in which the centroids are shifted for a ⅓ slow reproduction mode;

FIGS. 17a to 17f are diagrams illustrating timing of signals and the amount in which the centroids are shifted for a −1 reverse reproduction mode;

FIG. 19 is a truth table illustrating a first set of values of coefficient multipliers as a function of input signals to a control logic circuit of the vertical filter of FIG. 18, the amount in which the centroids are shifted and other information pertaining thereto;

FIG. 20 is a truth table illustrating a second set of values of coefficient multipliers as a function of input signals to the control logic circuit of the vertical filter of FIG. 18, the amount in which the centroids are shifted and other information pertaining thereto;

FIG. 21 is a truth table illustrating a third set of values of coefficient multipliers as a function of input signals to the control logic circuit of the vertical filter of FIG. 18, the amount in which the centroids are shifted and other information pertaining thereto;

FIGS. 24a and 24b are diagrams illustrating the timing relationship between an input signal and an output signal of a deblocking-deshuffling circuit in a normal reproduction mode; and FIG. 24c is a diagram of a field identification signal.

DESCRIPTION OF THE PREFERRED EMBODIMENTS

Figure 22:
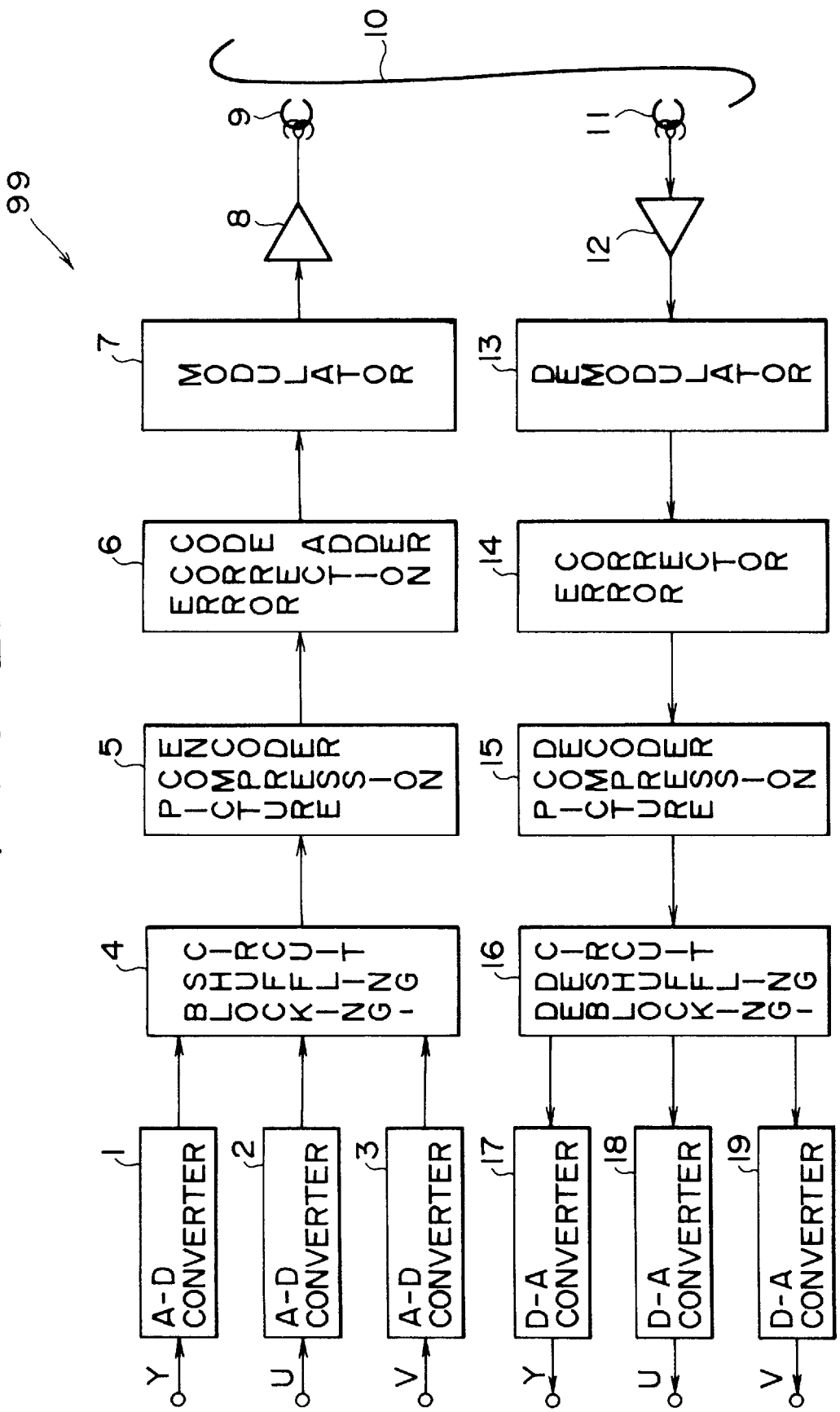
FIG. 22 is a diagram of a digital VTR to which the present video signal processing apparatus of FIG. 1 may be applied.
Figure 23:
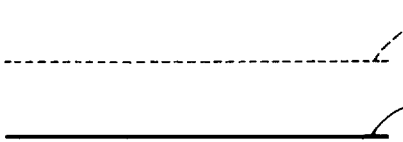
FIG. 23 is a diagram to which reference will be made in explaining the relationship between scanning lines in an effective area and an image plane for the NTSC 525/60 system.

A video signal processing apparatus according to the present invention will now be described with initial reference to FIG. 1. As shown therein, such video signal processing apparatus 97 includes a deblocking-deshuffling circuit 116, a microcomputer 31 and a vertical filter 32. Such apparatus may be utilized in recording and/or reproducing devices or the like, such as the digital VTR 99 of FIG. 22. In this latter situation, the deblocking-deshuffling circuit 16 of the digital VTR 99 is replaced with the video signal processing apparatus 97. As a result, the output signal from the picture compression decoder 15 is supplied to the deblocking-deshuffling circuit 116 and output Y, U and V signals from the vertical filter 32 are respectively supplied to the D-A converters 17–19. The remaining elements of the digital VTR 99 may operate in a manner substantially similar to that previously described and, in the interest of brevity, will not be repeated herein. The video signal processing apparatus 97 will now be further described hereinbelow.

The microcomputer 31 is adapted to supply an instruction signal to a capstan motor (not shown) so as to drive the same at a predetermined speed. The microcomputer 31 is further adapted to simultaneously supply control signals or flags VFF (video frame/field flag) and VFS (video first/second flag) to the deblocking-deshuffling circuit 116. Such control signals VFF and VFS may have either a relatively high value (H) or a relatively low value (L) and are utilized for designating output fields. In response to such control signals, the deblocking-deshuffling circuit 16 controls the order of the output fields.

The VFF control signal may provide an indication as to whether both fields of a frame are outputted or whether only one of such fields is outputted twice within the respective frame period. For example, a relatively low value of the VFF control signal may indicate that only one of the two fields of a frame is outputted twice within the respective frame, and a relatively high value thereof may indicate that both fields of a frame are outputted. On the other hand, the VFS control signal may provide an indication as to which of the fields is outputted twice during a frame period or the order in which two fields of a frame are outputted. FIG. 2 illustrates a relationship between the output fields and combinations of the control signals VFF and VFS. For example, as shown in FIG. 2, if the control signals VFF and VFS each have a relatively high value (H), then the deblocking-deshuffling circuit 116 causes the first field and the second field to be outputted in this order. As another example, if the control signal VFF has a relatively low value (L) and the control signal VFS has a relatively high value (H), then the deblocking-deshuffling circuit 116 causes the first field to be outputted twice.

Figure 3:
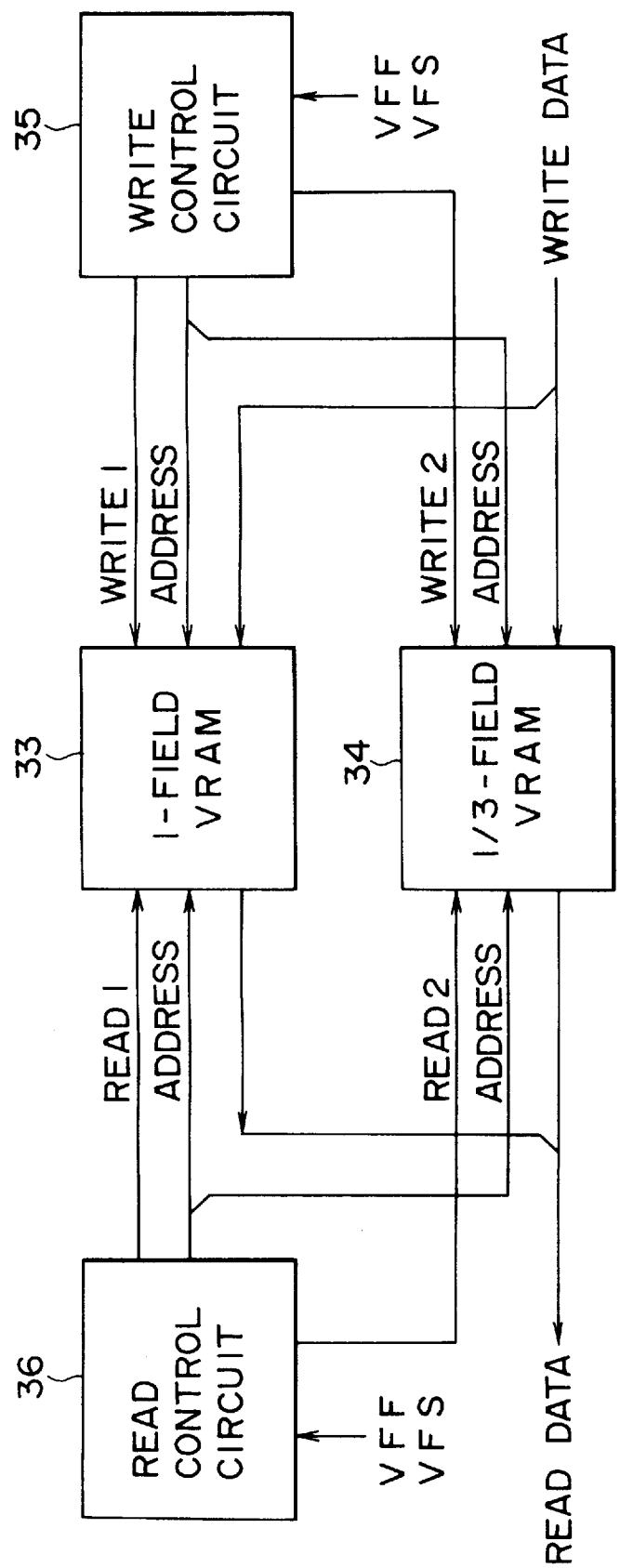
FIG. 3 is a block diagram of a deblocking-deshuffling circuit for controlling the order of fields outputted therefrom which may be utilized in the video signal processing apparatus of FIG. 1.

The deblocking-deshuffling circuit 116 may be configured as illustrated in FIG. 3. As shown therein, the deblocking-deshuffling circuit 116 may include a 1-field video random access memory (VRAM) 33, a ⅓-field VRAM 34, a write control circuit 35 and a read control circuit 36. The write control circuit 35 receives the control signals VFF and VFS and generates write control and address signals which are supplied to the appropriate one or ones of the VRAMs 33 and 34. As a result, input frame-unit picture data may be written into the VRAMs 33 and 34. The read control circuit 36 receives the control signals VFF and VFS and generates read control and address signals which are supplied to the appropriate one or ones of the VRAMs 33 and 34. As a result, the previously stored or written picture data may be read from the VRAMs 33 and 34 in field units. Such reading and writing of picture data may be performed so as to arrange the output field data in a desired order.

Thus, the deblocking-deshuffling circuit 116 receives frame-unit picture data from the picture compression decoder 15 (FIG. 22) and, in accordance with control signals VFF and VFS received from the microcomputer 31 (FIG. 1), executes write and read control signals for supply to the VRAMs 33 and 34 so as to produce field-unit picture data having a desired field order which is supplied therefrom. Writing and reading operations performed by the deblocking-deshuffling circuit 116 for several modes or situations will now be described hereinbelow.

Figure 4:
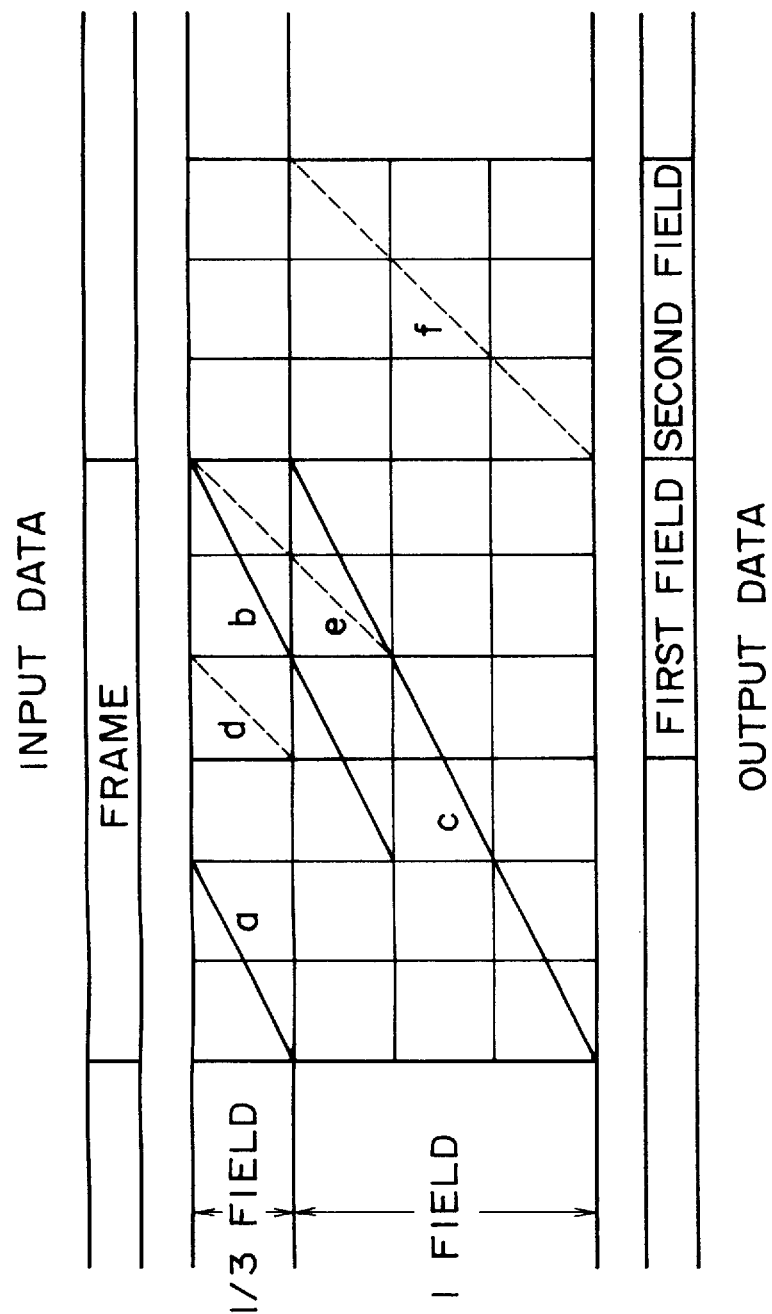
FIG. 4 is a diagram to which reference will be made in explaining write/read timing for a normal reproduction mode.

FIG. 4 illustrates the write/read timing for the VRAMs 33 and 34 during a normal reproduction mode. (In this and other similar figures in this application, that is, FIGS. 6, 8 and 9, solid and broken lines respectively represent writing and reading operations.) For the arrangement of FIG. 4, the control signal VFF has a high level (H) and the control signal VFS has a high level (H) as indicated in FIG. 2. In such arrangement, as shown in FIG. 4, a portion of data such as the first ⅓ of the first field of the input data of each frame is stored or written into the ⅓-field VRAM 34 during an interval a, a portion such as the second ⅓ of such first field is written into the 1-field VRAM 33 during an interval b, and a portion such as the last ⅓ of such first field is written into the ⅓-field VRAM 34 during the interval b. The data previously written into the ⅓-field VPAM 34 during the interval a is read during an interval d. Such reading of the data during interval d occurs prior to the writing of data into the ⅓-field VRAM 34 during interval b. Data corresponding to the second field of the input data of each frame is written into the 1-field VRAM 33 during an interval c. The data previously written into the 1-field VRAM 33 during the interval b is read during half (such as the first half) of an interval e, and the data previously written into the ⅓-field VRAM 34 during the interval b is read during the other half of the interval e. Further, the data previously written into the 1-field VRAM 33 during the interval c is read during an interval f.

Figure 5:
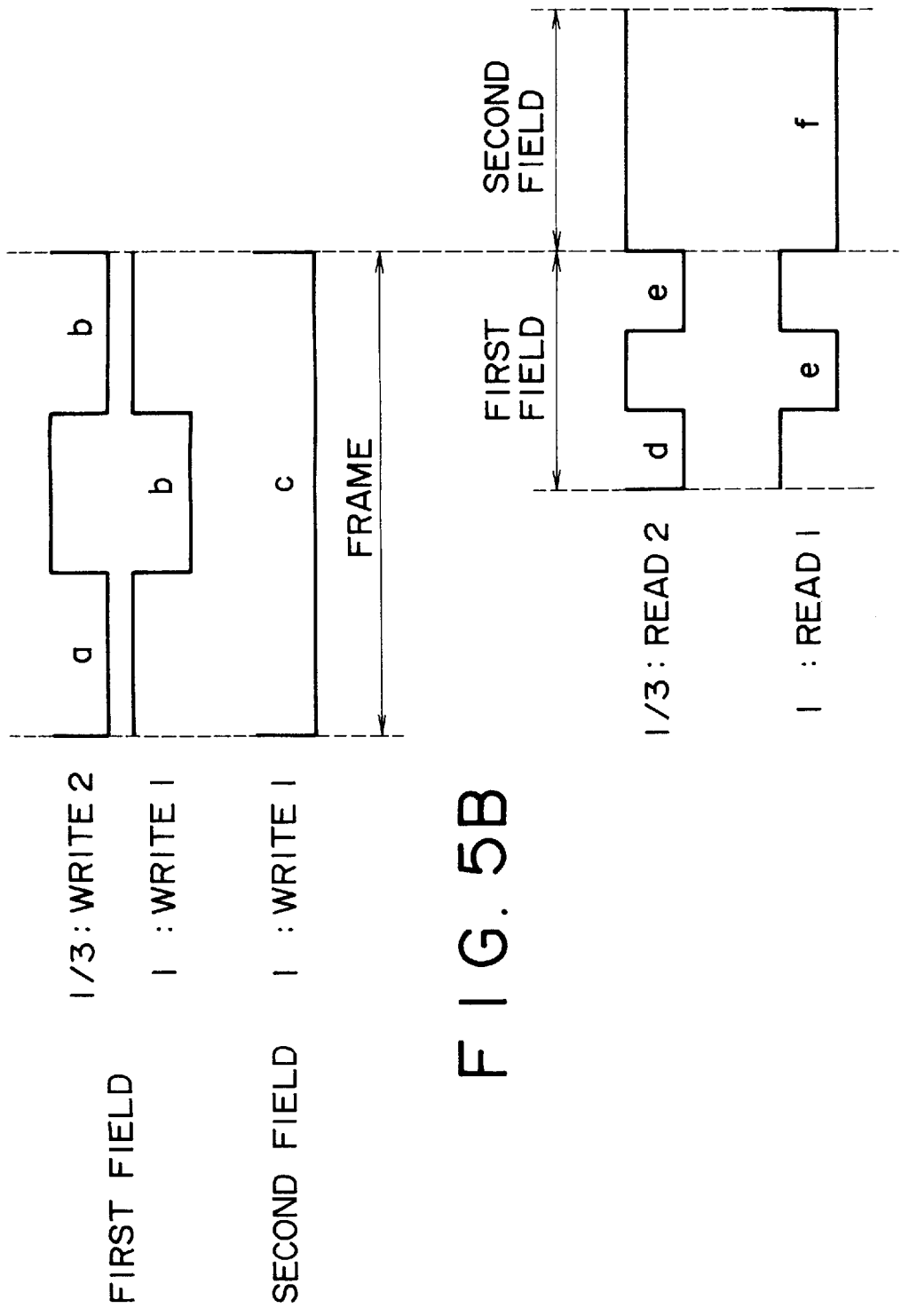
FIGS. 5A and 5B are diagrams illustrating write/read control signals which may be utilized in the normal reproduction mode.

FIGS. 5A and 5B respectively illustrate write control signals generated by the write control circuit 35 and read control signals generated by the read control circuit 36 for the write/read timing arrangement of FIG. 4. Accordingly, the intervals a–f of FIGS. 5A and 5B correspond to those of FIG. 4. Further, in these figures, write 1 represents a write control signal for the 1-field VRAM 33, write 2 represents a write control signal for the ⅓-field VRAM 34, read 1 represents a read control signal for the 1-field VRAM 33, and read 2 represents a read control signal for the ⅓-field VRAM 34. In FIGS. 5A and 5B, writing into and reading from the VRAMs 33 and 34 is performed when the corresponding control signal is at a relatively low level. Furthermore, the write/read operations may be performed on the input time-division picture data directly or on each component thereof.

Figure 6:
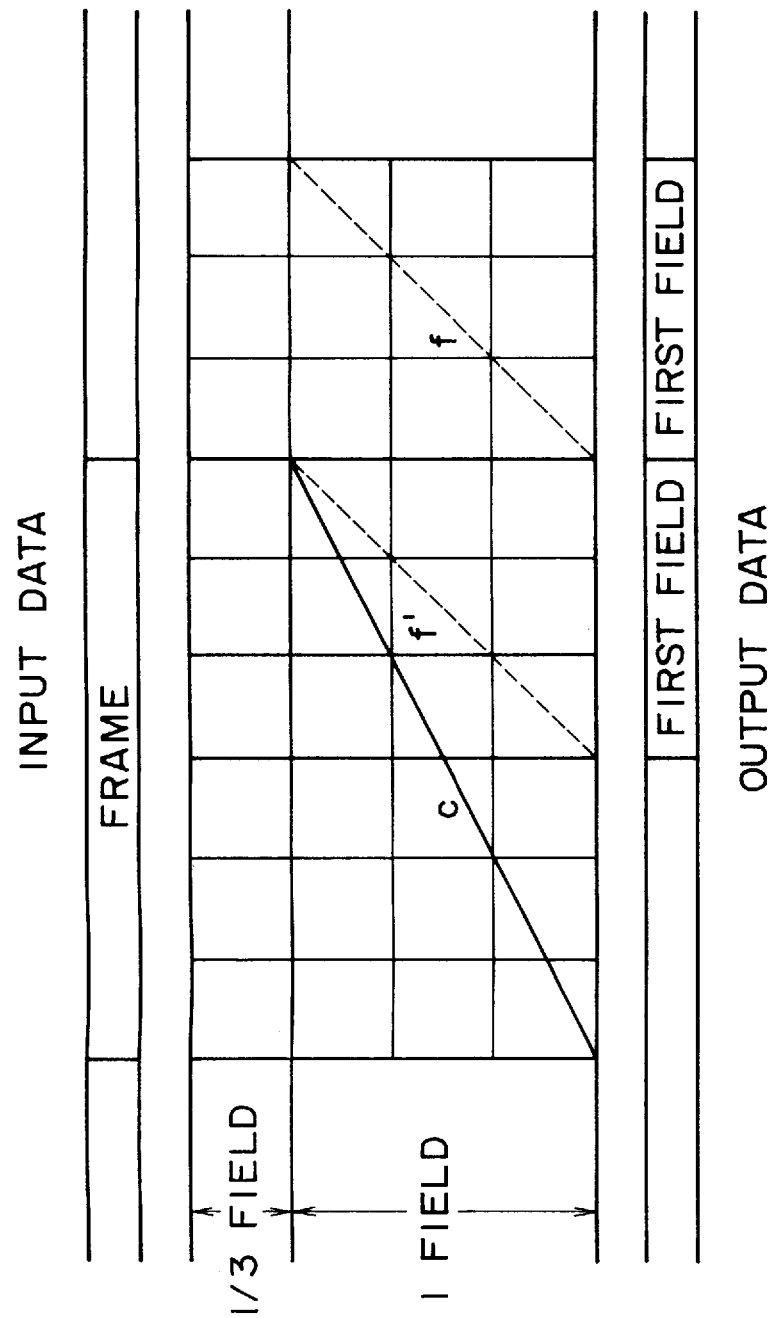
FIG. 6 is a diagram to which reference will be made in explaining write/read timing when data of first fields are successively outputted.

FIG. 6 illustrates the write/read timing for the VRAMs 33 and 34 when data of the first fields are outputted successively. For such situation, the control signal VFF has a low level (L) and the control signal VFS has a high level (H) as indicated in FIG. 2. In the arrangement of FIG. 6, data corresponding to the first field of the input data is written into the 1-field VRAM 33 during an interval c. Further, in such arrangement, the data previously written into the 1-field VRAM 33 during the interval c is read during the intervals f' and f.

Figure 7:
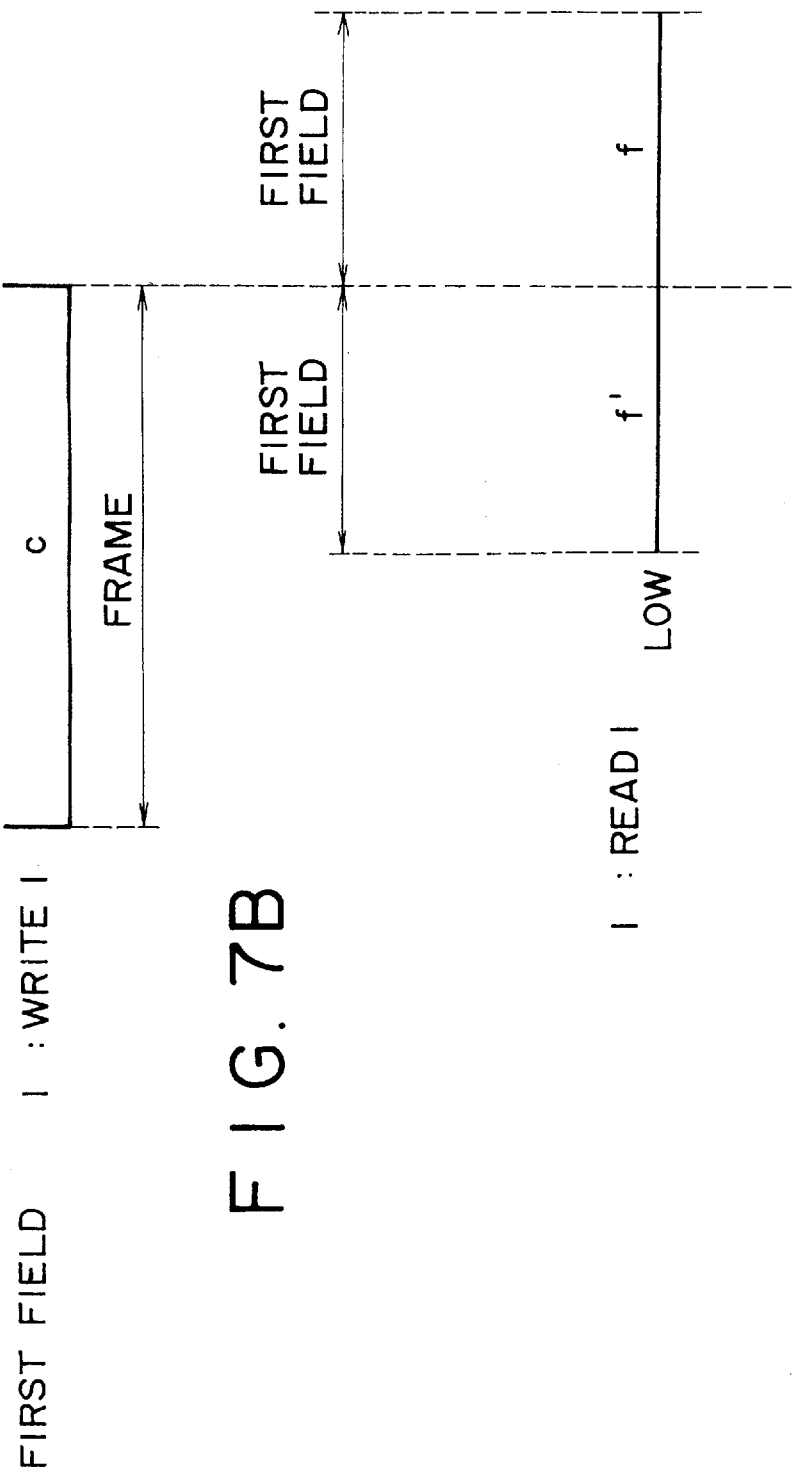
FIGS. 7A and 7B are diagrams illustrating write/read control signals which may be utilized when data of first fields are successively outputted.

FIGS. 7A and 7B respectively illustrate write control signals generated by the write control circuit 35 and read control signals generated by the read control circuit 36 for the write/read timing arrangement of FIG. 6. Accordingly, the intervals c, f' and f of FIGS. 7A and 7B correspond to those of FIG. 6. Further, in these figures, write 1 represents a write control signal for the 1-field VRAM 33 and read 1 represents a read control signal for the 1-field VRAM 33. As with the control signals of FIGS. 5A and 5B, writing into and reading from the VRAM 33 for the arrangement of FIG. 6 is performed when the corresponding control signals of FIGS. 7A and 7B are at relatively low levels.

Figure 8:
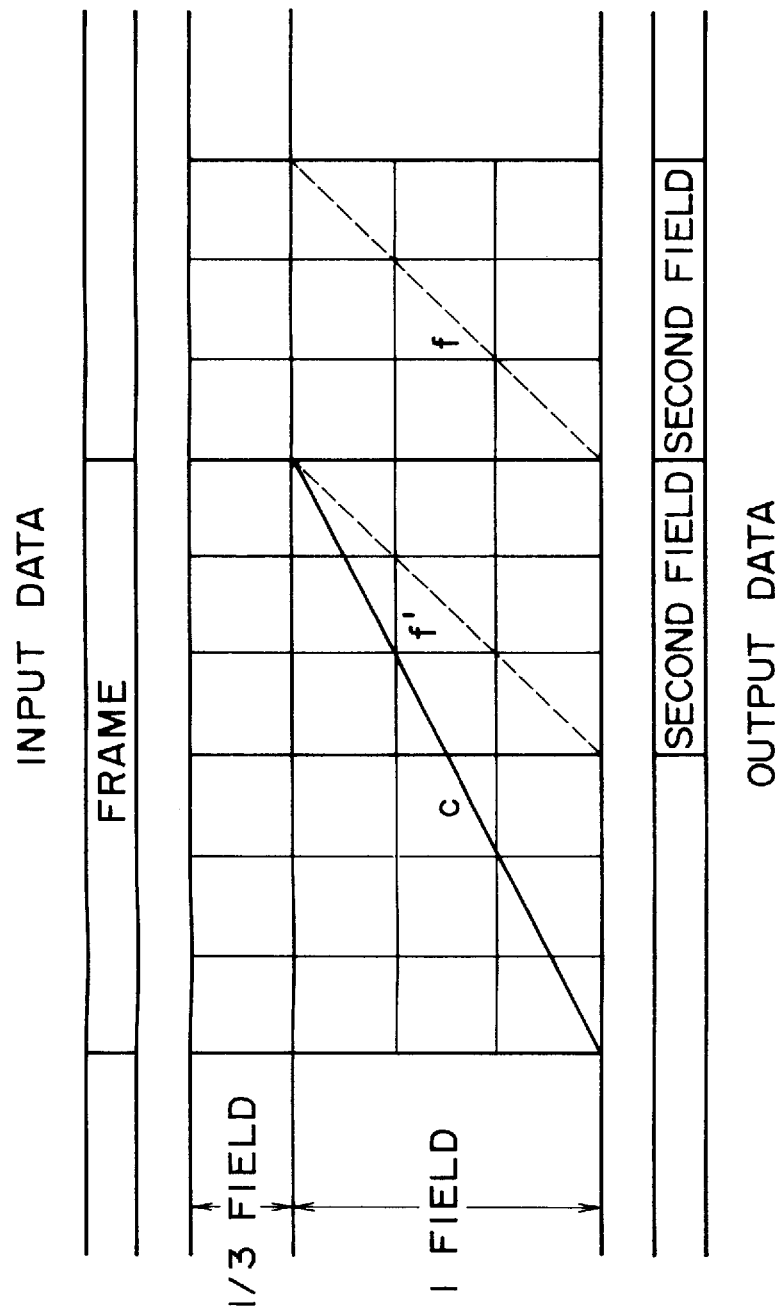
FIG. 8 is a diagram to which reference will be made in explaining write/read timing when data of second fields are successively outputted.

FIG. 8 illustrates the write/read timing for the VRAM 33 when data of the second fields are outputted successively. For such situation, the control signal VFF has a low level (L) and the control signal VFS has a low level (L) as indicated in FIG. 2. In the arrangement of FIG. 8, data corresponding to the second field of the input data is written into the 1-field VRAM 33 during an interval c. Further, in such arrangement, the data previously written into the 1-field VRAM 33 during the interval c is read during the intervals f' and f. The write and read control signals for this arrangement are similar to those shown in FIGS. 7A and 7B.

Figure 9:
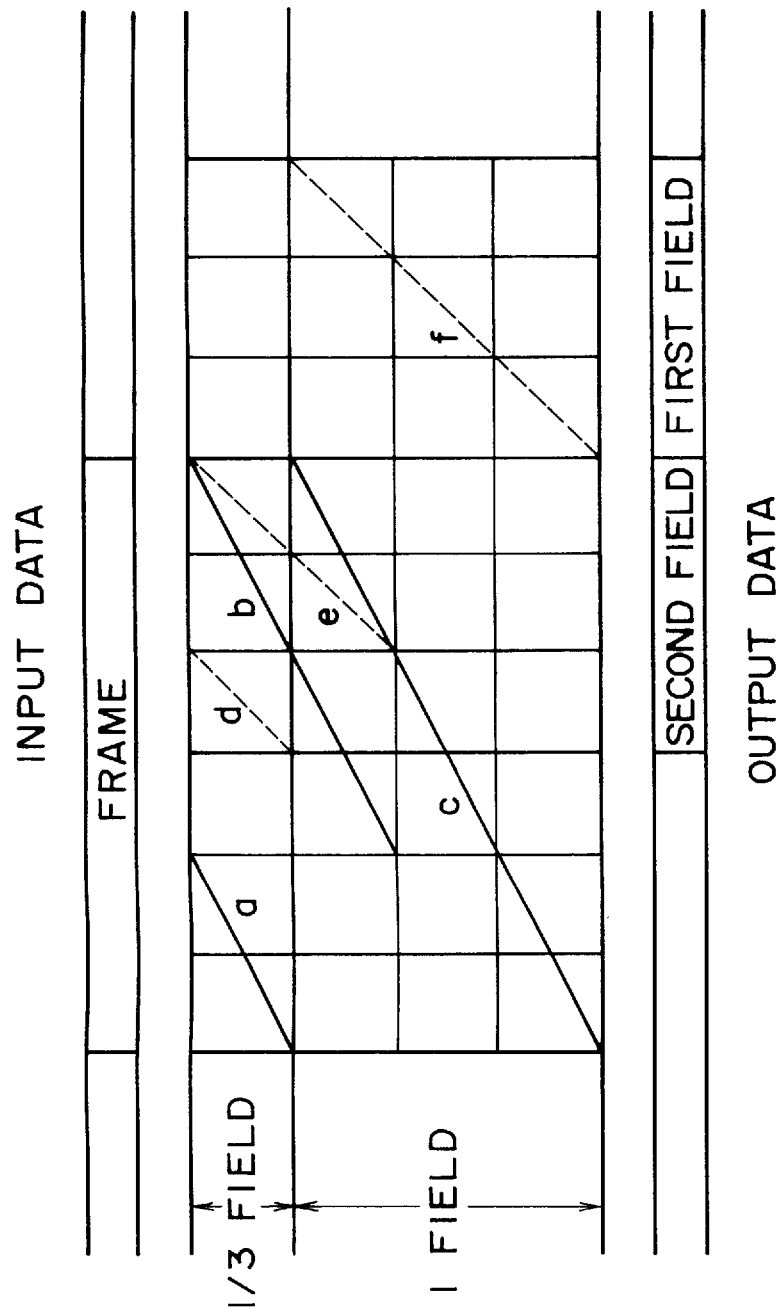
FIG. 9 is a diagram to which reference will be made in explaining write/read timing when the field order is inverted and data are outputted.
Figure 10:
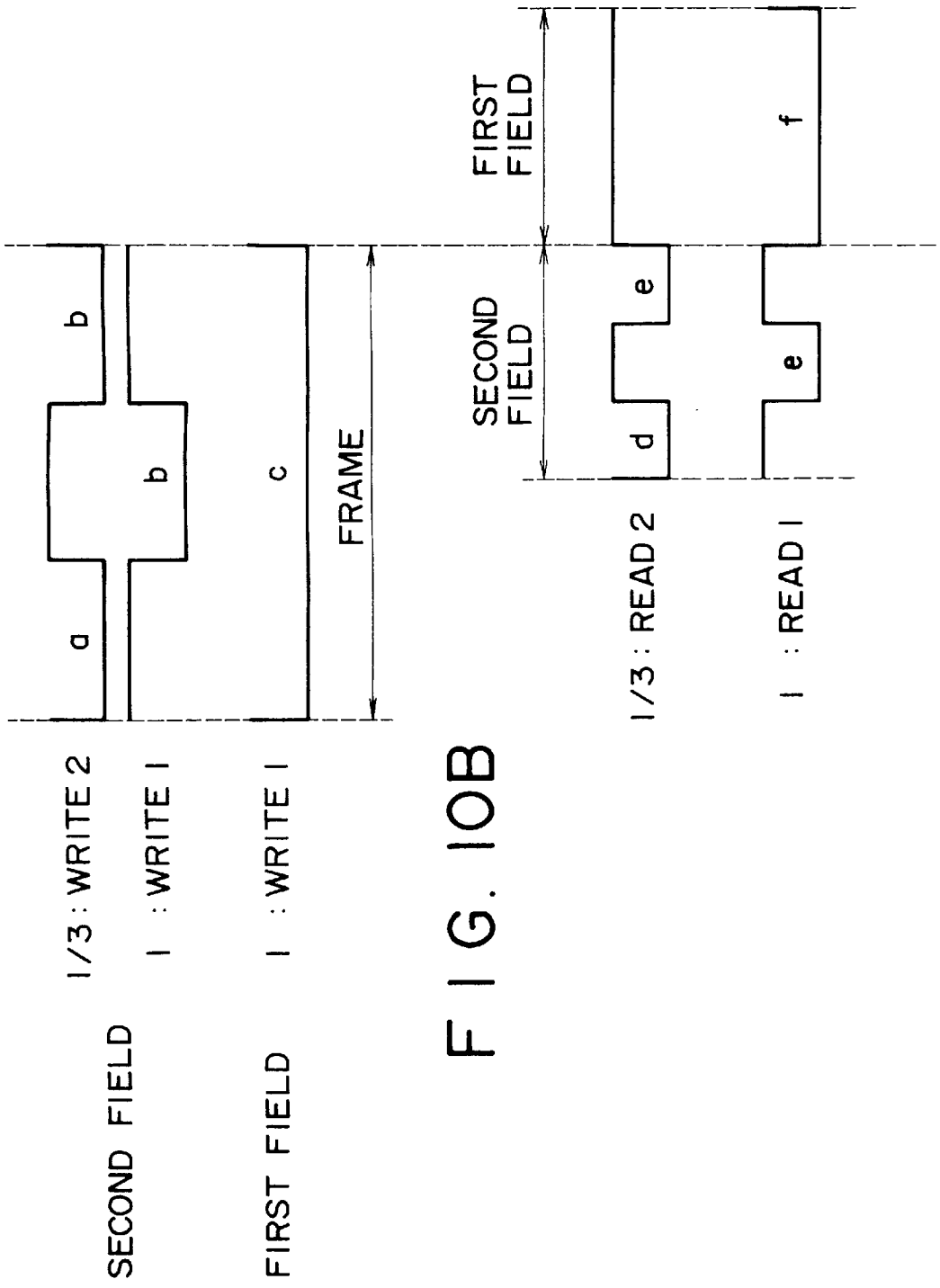
FIGS. 10A and 10B are diagrams illustrating write/read control signals which may be utilized when the field order is inverted and data are outputted.

FIG. 9 illustrates the write/read timing for the VRAMs 33 and 34 when data are outputted in an inverted or reversed field order. For this arrangement, the control signal VFF has a high level (H) and the control signal VFS has a low level (L) as indicated in FIG. 2. The timing arrangement of FIG. 9 is similar to that of FIG. 4 and, as such, a further description thereof is omitted. The write and read control signals for this arrangement are shown in FIGS. 10A and 10B. As is to be appreciated, such control signals are similar to those of FIGS. 5A and 5B and, as such, a further description thereof is omitted.

Thus, by utilizing the above-described arrangements for reading and writing so as to convert frame-unit picture data into field-unit picture data, the present deblocking-deshuffling circuit 116 may utilize VRAMs having a relatively small storage capacity (such as that which is able to store 1⅓ fields of data) as compared to that normally required (which may store two or more fields of data). Further, such present writing and reading control enables the output field data to be arranged or set in a desired or arbitrary order.

Although in the above descriptions the writing and reading operations were performed in response to write and read control signals having low values, the present invention is not so limited. As an alternative, the present invention may be arranged so that writing and reading operations are performed in response to relatively high level control signals.

Referring back to FIG. 1, the microcomputer 31 further supplies the VFF and VFS control signals and a SFON (still filter on) signal to the vertical filter 32. The vertical filter also receives signals Y, U and V and a field identification signal (FLID) from the deblocking-deshuffling circuit 116. An example of such FLID signal is illustrated in FIG. 24c. The vertical filter 32 is adapted to shift the centroid of a picture in a predetermined direction, such as in a vertical direction, in accordance with the SFON, VFF, VFS and FLID signals. Such vertical filter 32 may include a plurality of vertical filters each adapted to process one of the Y, U, and V output signals from the deblocking-deshuffling circuit 116. Different embodiments of the present vertical filter will now be described hereinbelow.

Figure 1:
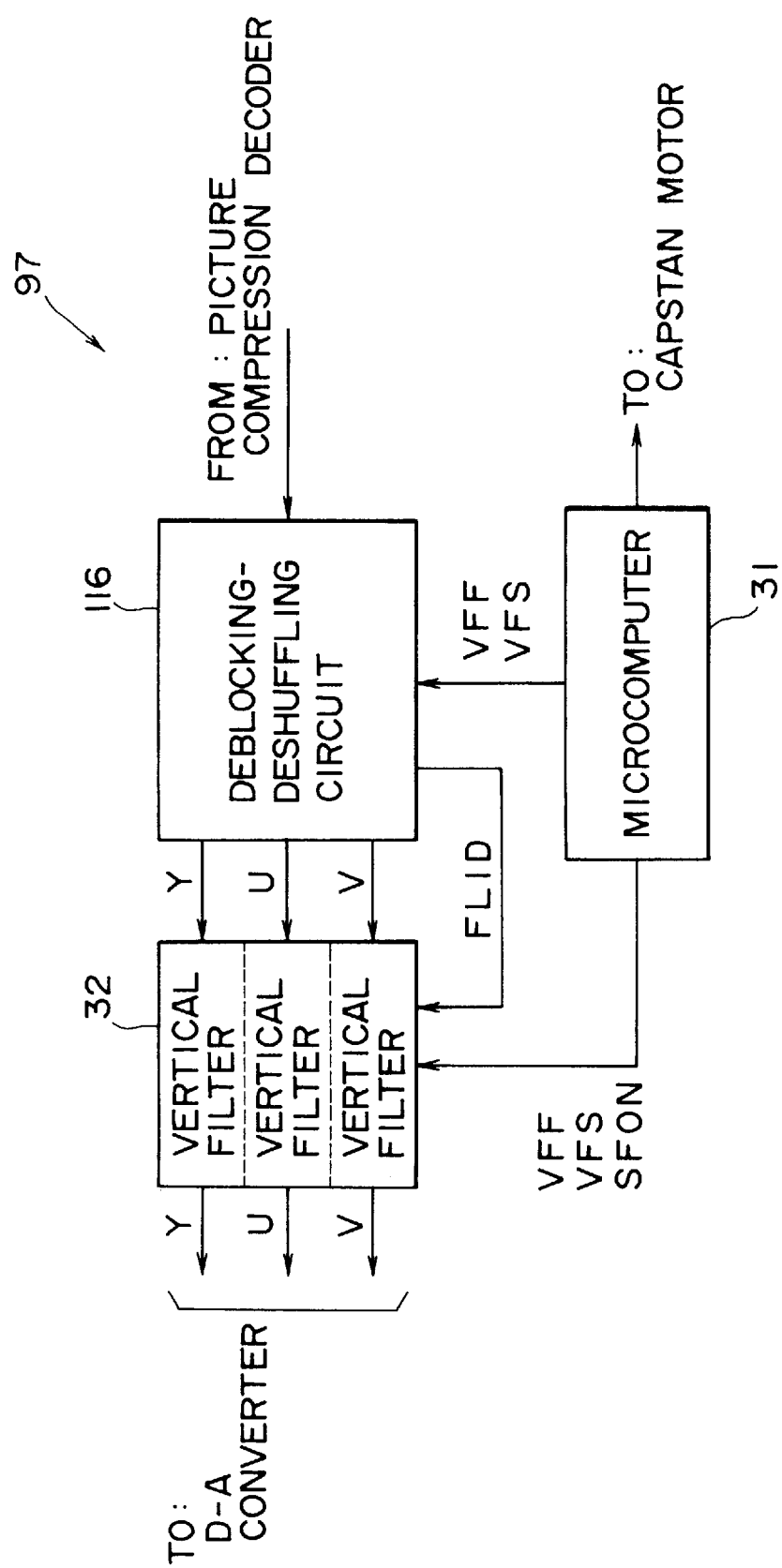
FIG. 1 is a block diagram of a video signal processing apparatus according to an embodiment of the present invention.
Figure 11:
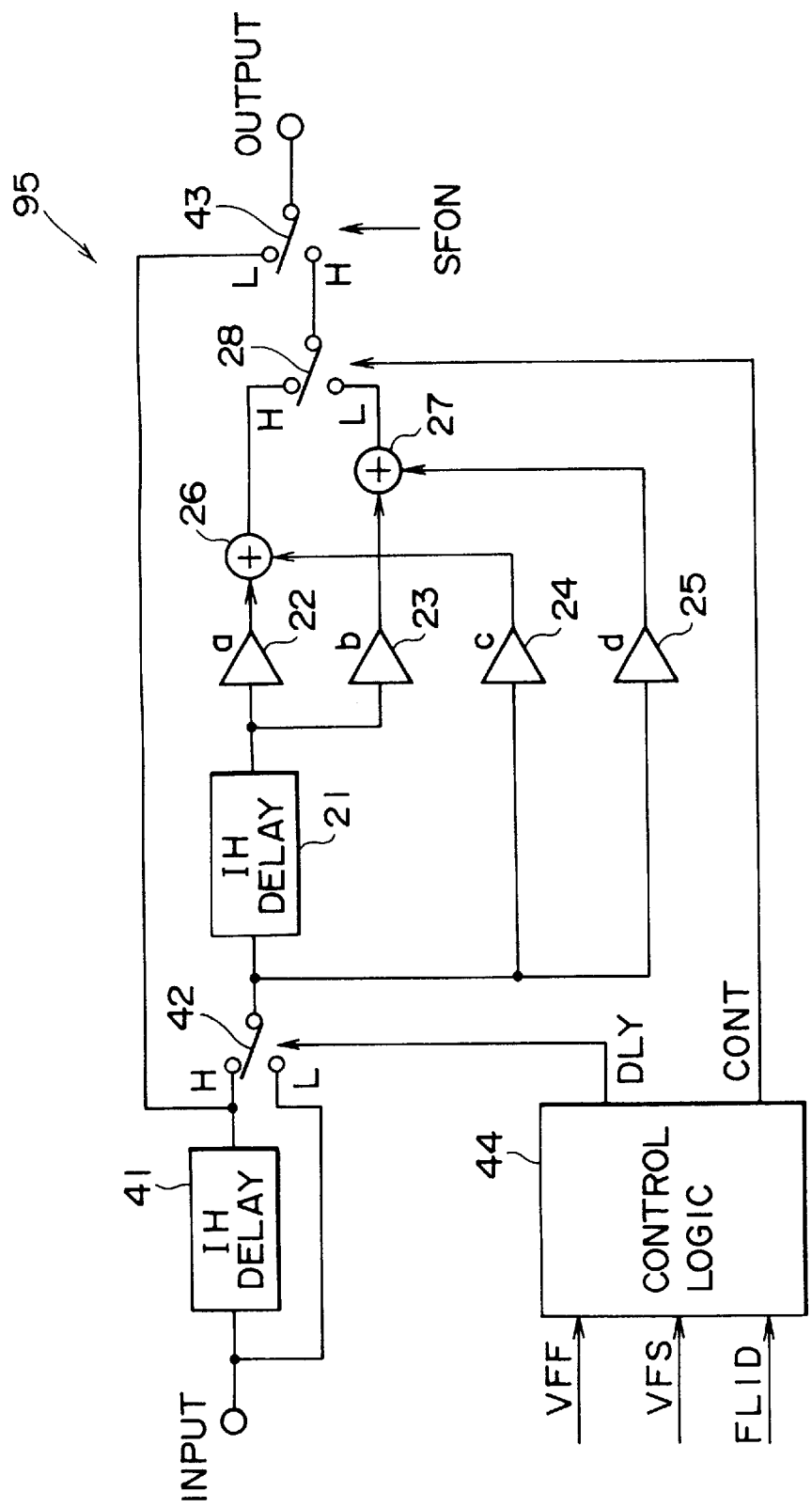
FIG. 11 is a block diagram of a vertical filter which may be utilized in the video signal processing apparatus of FIG. 1.

FIG. 11 illustrates a vertical filter 95 which may be utilized in the video signal processing apparatus 97 (FIG. 1). As shown therein, such vertical filter 95 includes 1H delay circuits 21 and 41, a control logic circuit 44, coefficient multipliers 22–25, adders 26 and 27, and switches 28, 42 and 43. An input signal, such as a Y output signal from the deblocking-deshuffling circuit 116 is supplied through an input terminal to the 1H delay circuit 41 and a low terminal of the switch 42. The 1H delay circuit 41 is adapted to delay the received signal by a predetermined time amount, such as that corresponding to the time associated with one horizontal line. A delay signal from the 1H delay circuit 41 is supplied to a high terminal (H) of the switch 42 and a low terminal (L) of the switch 43. The switch 42 is operable in accordance with a control signal DLY from the control logic circuit 44 so as to select either the H or L terminal. An output signal from the switch 42 is supplied to the 1H delay circuit 21 and coefficient multipliers 24 and 25. The coefficient multipliers 24 and 25 are adapted to respectively multiply the received signal by predetermined coefficients c and d. The 1H delay circuit 21, like the 1H delay circuit 41, delays the received signal and supplies the same to the coefficient multipliers 22 and 23, whereupon such delayed signal is respectively multiplied by predetermined coefficients a and b. Multiplied output signals from the coefficient multipliers 22 and 24 are are supplied to the adder 26, whereupon such signals are added so as to form a summed signal which is supplied to a high terminal (H) of the switch 28. In a similar manner, multiplied output signals from the coefficient multipliers 23 and 25 are added by the adder 27 and a formed summed signal is supplied therefrom to a low terminal (L) of the switch 28. The switch 28 is controlled in accordance with a control signal CONT from the control logic circuit 44 so as to select either the H or L terminal. An output signal from the switch 28 is supplied to the high terminal (H) of the switch 43. The switch 43 is controlled in accordance with the signal SFON received from the microcomputer 31 (FIG. 1) and supplies an output signal therefrom to an output terminal.

The control logic circuit 44 is adapted to receive signals VFF, VFS and FLID from the microcomputer 31 (FIG. 1) and form control signals DLY and CONT in accordance with such received signals. As previously described, the control logic circuit 44 supplies the DLY signal to the switch 42 and supplies the CONT signal to the switch 28. As a result, the switch 42 selects either a delayed output signal from the 1H delay line 41 or the input signal from the input terminal, and the switch 28 selects either the H or L terminal thereof so as to supply therefrom either the output of the adder 26 or 27.

Values of the DLY and CONT signals formed by the logic control circuit 44 as a function of the input signals VFF, VFS and FLID are illustrated in FIG. 12. Also illustrated in this truth table are the contents or results of the processing performed by the vertical filter 95 as a result of each combination of the input signals. More specifically, the truth table of FIG. 12 provides the eight (1–8) combinations of output signals for a variable-speed reproduction mode wherein the SFON signal has a relatively high (H) level. As a result, signals from the switches 28 and 42 are selectively changed depending upon which of the first and second fields is to be outputted as a first field or a second field so as to shift the centroid of the respective picture in four ways as hereinafter more fully described.

In a normal reproduction mode, the SFON signal has a relatively low (L) level and the delayed output signal of the 1H delay line 41 is selected and supplied by way of the low (L) terminal of the switch 43 to the output terminal. Such signal or data is passed through the 1H delay line 41 during the normal reproduction mode so as to minimize the vertical shift of the picture at the switchover between normal and variable-speed reproduction. In the variable-speed reproducing modes, on the other hand and as previously described, the SFON signal has a relatively high (H) level. As a result, in this situation, the signal supplied from the switch 43 is processed by the portion of the vertical filter 95 including the 1H delay circuit 21, coefficient multipliers 22–25, and adders 26 and 27. Accordingly, the SFON signal effectively controls whether or not the input signal is processed or filtered by such portion of the vertical filter. Thus, the SFON signal controls whether such filtering is on or off.

The signal supplied from the output terminal of the vertical filter 95 corresponds to the signal received by such vertical filter wherein the centroid of a picture corresponding thereto may be shifted by an amount due to the processing performed therein. More specifically, the vertical filter 95 operates such that the centroid positions of the respective pictures are rendered effectively fixed when pictures of the same fields are successively outputted, and such that the centroid position is selectively shifted in other situations as hereinafter more fully described. As a result, the vertical filter 95 enables variable-speed reproduced video signals to be obtained without any, or with a minimal amount of, line flicker during both still and slow reproduction modes. Further, the present vertical filter 95 enables changes in the resolution or frequency characteristics to be diminished so that plane flicker may be suppressed when a frame of first and second output fields is inserted between frames of either successive first or successive second output fields.

Figure 13:
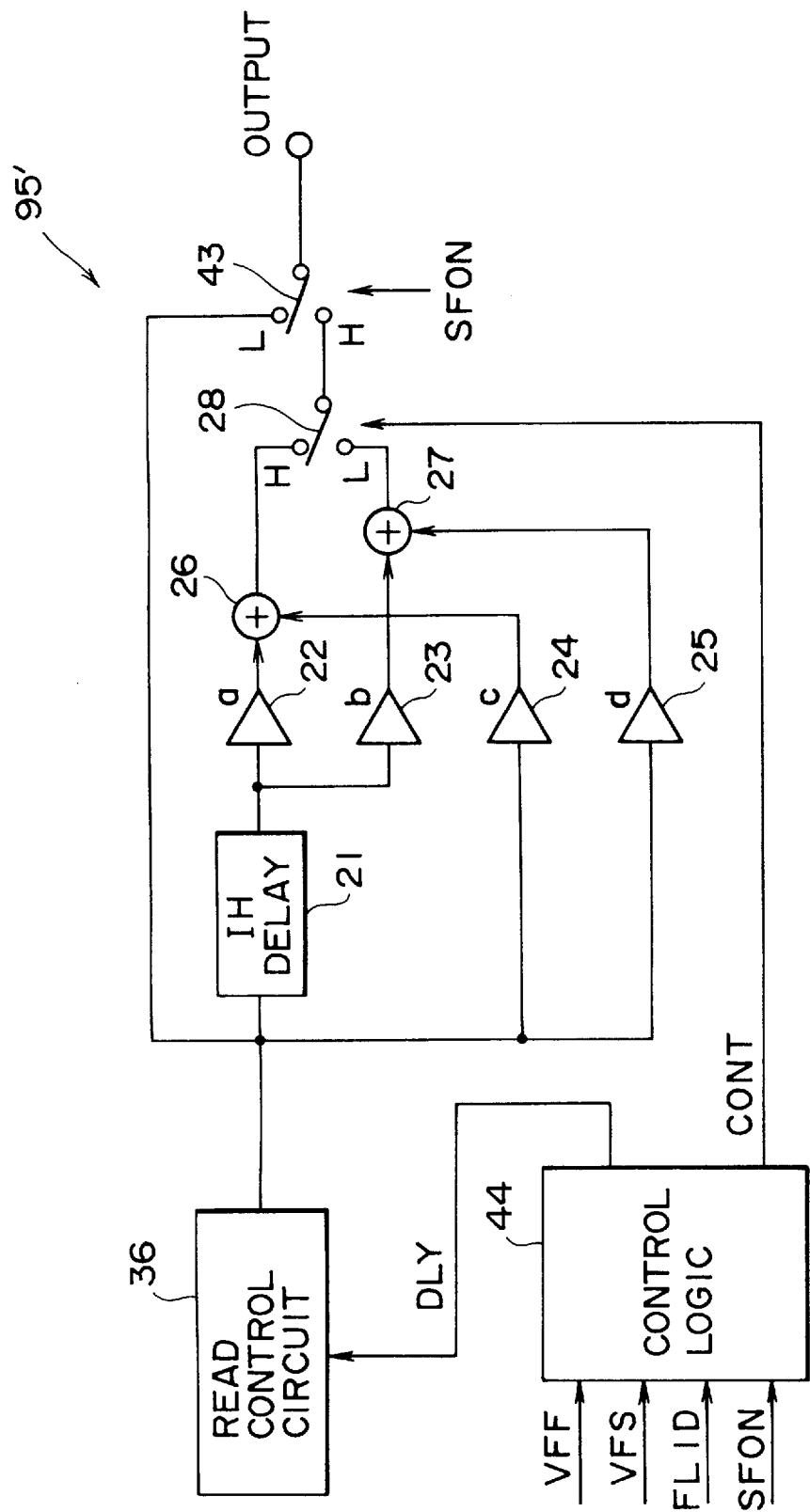
FIG. 13 is a modification of the vertical filter of FIG. 11 wherein a line delay circuit is omitted by controlling the read timing of a memory in the deblocking-deshuffling circuit of FIG. 3.

FIG. 13 illustrates a modification of the vertical filter 95. As shown therein, the 1H delay circuit 41 is replaced by the read control circuit 36 of the deblocking-deshuffling circuit 116 which is operated to control the timing for reading data from the VRAM so as to effectively obtain the delay caused by the 1H delay circuit 41. The remaining portion of the modified vertical filter 95' is substantially similar to the vertical filter 95 and, as such, will not be further described herein. As a result, the vertical filter 95' is configured without the 1H delay circuit 41, thereby reducing the number of components and cost of the vertical filter.

Figure 14:
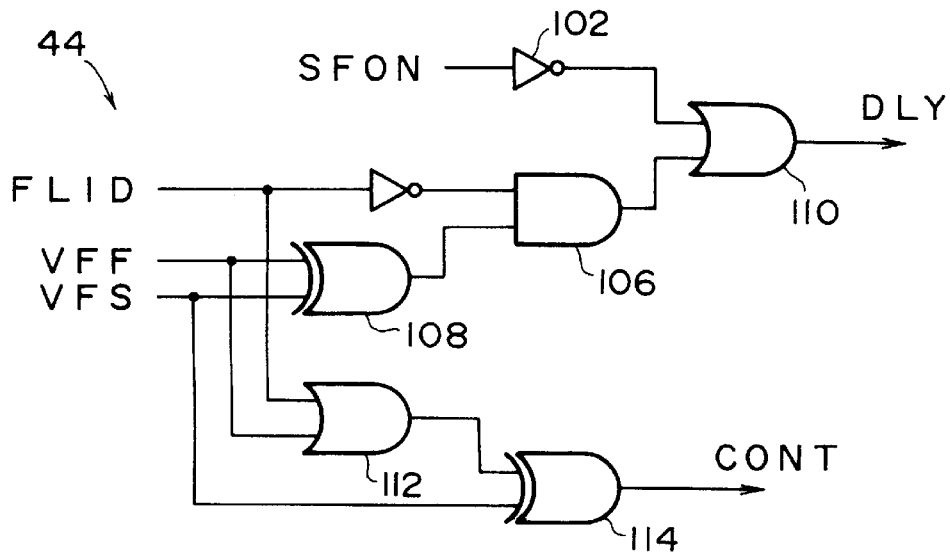
FIG. 14 is a block diagram of a control logic circuit of the vertical filter of FIG. 13.

FIG. 14 illustrates the control logic circuit 44 in more detail. As shown, such control logic circuit 44 includes inverters 102 and 104, an AND gate 106, OR gates 110 and 112, and EXCLUSIVE-OR (XOR) gates 108 and 114 which are connected as shown in FIG. 14. More specifically, the signal SFON from the microcomputer 31 (FIG. 1) is supplied to the inverter 102, whereupon the signal is inverted and supplied to one input of the OR gate 110. The signal FLID from the deblocking-deshuffling circuit 116 (FIG. 1) is supplied to one input of the OR gate 112 and to the inverter 104 so as to be inverted. The signal VFF from the microcomputer 31 is supplied to one input of the XOR gate 108 and to the other input of the OR gate 112. The signal VFS from the microcomputer 31 is supplied to the other input of the XOR gate 108 and one input of the XOR gate 114. The inverted signal from the inverter 104 and an output signal from the XOR gate 108 are supplied to the AND gate 106 which, in turn, supplies an output signal to the other input of the OR gate 110. The output signal of the OR gate 110 is the DLY signal. An output signal from the OR gate 112 is supplied to the other input of the XOR gate 114 which, in turn, produces the CONT signal for supply therefrom.

FIG. 15 illustrates a truth table for the control logic circuit 44 of FIG. 13. The table of FIG. 15 indicates values of the output signals CONT and DLY for different combinations of input signals SFON, VFF, VFS and FLID. As an example, if SFON has a high (H) value and each of the other input signals (that is, VFF, VFS and FLID) has a low (L) value, then the CONT and DLY signals produced by the control logic circuit 44 each have a low (L) value. Furthermore, in this arrangement, the read timing is controlled so as to be delayed by 1H when DLY has a relatively high (H) value, and not to be delayed when DLY has a relatively low (L) value.

An example of variable-speed reproduction will now be described with reference to FIG. 16. Such FIG. 16 illustrates the timing for a ⅓ slow reproduction mode. As shown therein, FIGS. 16a and 16b respectively illustrate input and output signals of the deblocking-deshuffling circuit 116, FIGS. 16c–16e respectively illustrate the signals FLID, VFS and VFF, and FIG. 16f illustrates the control logic and the amount in which the centroid is shifted.

More specifically, in a frame having periods or fields T1 and T2, a first field of frame 0 is outputted twice as shown in FIG. 16b. (In particular, reference is made to the two left-most blocks labelled "0–1" of FIG. 16b. Such "0–1" refers to the 0th frame and the 1st field.) As shown in FIG. 16f, during the period T1, the control logic is (4) and the centroid of the picture corresponding to the respective field is shifted downward by ⅝ line; and during the period T2, the control logic is (3) and the centroid of the picture corresponding to the respective field is shifted downward by ⅜ line. (The control logic referred to in FIG. 16f is described in FIG. 12.) As a result of such shifting, the picture outputted as the latter-half second field is positioned so as to be ½ line lower than the picture of the former-half first field. As a result, the respective centroids are coincident with each other and, as such, line flicker is eliminated or reduced.

In periods T3 and T4, the centroids of the respective pictures are each shifted downward by ⅝ line and, as a result, the positional relationship between the first and second fields is maintained which enables a natural picture to be obtained. During such periods T3 and T4, the control logic is (8) and (7), respectively.

The centroid of the picture corresponding to the field or period T5 is shifted downward by ⅛ line and the centroid of the picture corresponding to the field or period T6 is shifted downward by ⅝ line. As a result, the picture outputted as the latter-half second field is positioned so as to be ½ line lower than the picture of the former-half first field, in a manner similar to that performed during the periods T1 and T2. As such, line flicker is eliminated or reduced. During such periods T5 and T6, the control logic is (2) and (1), respectively.

The above-described processing is repeated every three frames thereafter.

Thus, the present invention enables smooth slow reproduction to be performed throughout the frames without any line flicker. Furthermore, although a frame having first and second fields is inserted in the periods T3 and T4 between frames formed of successive first fields (T1 and T2) and frames formed of successive second fields (T5 and T6), plane flicker may be suppressed by the present invention.

FIG. 17 illustrates the timing of signals for a −1 reverse reproduction mode. As shown therein, FIGS. 17a and 17b respectively illustrate input and output signals of the deblocking-deshuffling circuit 116, FIGS. 17c–17e respectively illustrate the signals FLID, VFS and VFF, and FIG. 17f illustrates the control logic and the amount in which the centroid is shifted. FIGS. 17a–f are similar or correspond to FIGS. 16a–f and, as such, a further explanation of FIGS. 17a–f is omitted herein. In any event, the present invention enables satisfactory reproduced pictures to be obtained without any line flicker for the reverse reproduction mode of FIG. 17 as for the slow reproduction mode.

As previously described, the centroids are shifted by predetermined amounts such as ⅛, ⅝ or ⅞ of a line interval. An explanation as to how such amounts are determined will now be provided.

In still or slow reproduction modes or the like, first and second fields of outputted pictures are generated from an original field which is either an odd or even field. (The first and second fields respectively correspond to odd and even fields. Such first/second and odd/even is used to aid in distinguishing between the outputted pictures and the original pictures.) In this situation, four arrangements are possible:

1. an odd field of the original picture is outputted during first field periods of outputted pictures,
2. an odd field of the original picture is outputted during second field periods of outputted pictures,
3. an even field of the original picture is outputted during first field periods of outputted pictures, and
4. an even field of the original picture is outputted during second field periods of outputted pictures.

In arrangements 1 and 4 above, the first and second fields of the outputted pictures respectively correspond to the odd and even fields of the original pictures. As a result, the centroids need not be shifted. In arrangement 2, there is an upward shift of ½ line interval. Accordingly, in this arrangement, the centroids should be shifted downward by ½ line interval. Similarily, in arrangement 3, the centroids should be shifted upward by ½ line interval.

It is difficult to shift centroids upwards as for the above arrangement 3. Therefore, as an alternative to shifting centroids up and down as described above, the centroids for all of the above 1–4 arrangements are shifted downward by an offset amount. One preferred such offset amount is ⅝ line interval. Utilizing such offset amount causes the centroids for arrangements 1 and 4 to be shifted downward by ⅝ line interval, the centroid for arrangement 2 to be shifted downward by ⁹⁄₈ line interval, and the centroid for arrangement 3 to be shifted downward by ⅛ line interval.

Other offset amounts, in addition to ⅝ line interval, may be utilized. For example, ¾ line interval may be used. However, a ¾ line interval offset would produce a net shift of zero for arrangement 3 above. As a result, the resolution for this arrangement is not decreased as compared to the other arrangements and, as such, plane flicker due to such difference in resolution may arise.

Figure 18:
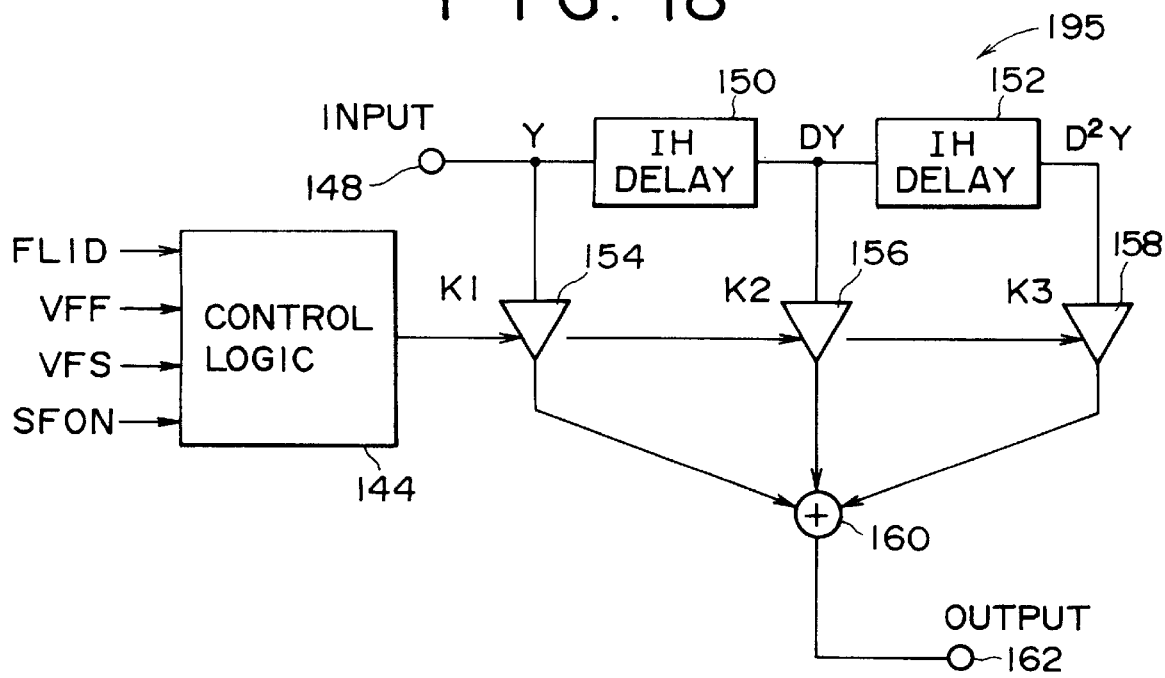
FIG. 18 is a block diagram of another vertical filter which may be utilized in the video signal processing apparatus of FIG. 1.

Another embodiment of the present vertical filter is illustrated in FIG. 18. As shown therein, such vertical filter 195 includes a control logic circuit 144, 1H delay circuits 150 and 152, coefficient multipliers 154, 156 and 158, and an adder 160. More specifically, an input signal from the deblocking-deshuffling circuit 116 (such as a Y signal) is supplied through an input terminal 148 to the coefficient multiplier 154 and the 1H delay circuit 150 which is adapted to delay the received signal by a predetermined time amount such as that corresponding to the processing time associated with 1 horizontal line. A delayed signal from the 1H delay circuit 150 is supplied to the coefficient multiplier 156 and the 1H delay circuit 152, whereupon such received signal is delayed in a manner similar to that performed by the delay circuit 150. A delayed signal from the delay circuit 152 is supplied to the coefficient multiplier 158. The control logic circuit 144 is adapted to receive input signals FLID, VFF, VFS and SFON from the microcomputer 31 and the deblocking-deshuffling circuit 116 (FIG. 1) and generate control signals in accordance with such input signals. The control logic circuit 144 is further adapted to supply such control signals to the coefficient multipliers 154, 156 and 158. Each of the coefficient multipliers 154, 156 and 158 has a variable coefficient (K1, K2 and K3) which is selected in accordance with the received control signals. The variable coefficient multipliers respectively multiply the received input or delayed signal by the selected coefficient. The multiplied signals from the coefficient multipliers 154, 156 and 158 are added by the adder 160, whereupon the obtained summed signal is supplied to an output terminal 162 for supply therefrom. Such summed signal corresponds to the input signal wherein the centroid of a picture corresponding thereto may be shifted by an amount corresponding to the processing performed therein.

Thus, in the vertical filter 195, coefficients K1 to K3 of the coefficient multipliers 154, 156 and 158 are selected by the control logic circuit 144.

FIGS. 19 to 21 illustrate values for the coefficients K1 to K3, output signals or characteristics, the amount in which the centroid is shifted, and the contents of the output data as a function of the input signals to the control logic circuit 144 (that is, VFF, VFS, FLID and SFON). Also indicated on FIGS. 19–21 is the control logic 1-9. That is, control logic 1-8 refers to the aforementioned logic in FIG. 12, and control logic 9 corresponds to a normal reproduction mode. Data is passed through the 1H delay circuit(s) even in the normal reproducing mode so as to minimize the vertical shift which may otherwise be caused at the switchover from a normal reproduction to variable-speed reproduction.

In the above-described circuit, a minimum vertical shift of ⅛ is utilized. However, other minimum vertical shift amounts may be utilized.

Although the present invention was described in conjunction with a digital VTR, the present invention is not so limited and may be applied to a number of other devices. For example, the present invention may be utilized with a digital video disk player and so forth.

Further, although the vertical filter 32 may have a plurality of portions or filters each adaptable for separately processing one signal (such as either the Y, U or V signal), the present invention is not so limited. As an alternative, the vertical filter may be configured so as to process all of the desired signals within a single portion or filter. Moreover, although it is preferred to have vertical filters for the Y, U and V signals as described above, the present invention is not so limited. For example, the present invention may utilized only a vertical filter for the Y signal.

Furthermore, the present invention is not limited to only one type of system (such as the 525/60 system), but may also be applied to other systems such as the 625/50 system or a high definition (HD) system and so forth.

Therefore, the present invention selectively adjusts the centroids of pictures so as to enable smooth variable-speed reproduction to be performed while preventing line flicker and suppressing plane flicker. Further, the circuit complexity of the vertical filter can be reduced by controlling the read timing of the memory which converts a frame-unit video signal into a field-unit video signal. Furthermore, since the VRAMs utilized by the present apparatus have a relatively small storage capacity, the size and cost associated therewith are minimized.

Although illustrative embodiments of the present invention and modifications thereof have been described in detail herein, it is to be understood that this invention is not limited to these embodiments and modifications, and that other modifications and variations may be affected therein by one skilled in the art without departing from the scope and spirit of the invention as defined by the appended claims.

What is claimed is:

1. A video signal processing method for converting a frame video signal representing a plurality of video frames into a field video signal representing a plurality of video fields, said method comprising the steps of:

writing said frame video signal in memory means at a first predetermined rate and reading out said frame video signal from said memory means at a second predetermined rate in which one of said first and second predetermined rates is faster than the other;

controlling the order in which the fields of said field video signal are read from said memory means so as to arrange the fields in a desired order; and filtering the field video signal read from said memory means by vertical filter means having a coefficient selectively set in accordance with the field order.

2. The video signal processing method according to claim 1, wherein said memory means includes means operable as delay means for said vertical filter means to delay the field video signal for controlling the timing at which the field video signal is read out therefrom.

3. A video signal processing method for converting a frame video signal representing a plurality of video frames into a field video signal representing a plurality of video fields, said method comprising the steps of:

writing said frame video signal in memory means at a first predetermined rate and reading out said frame video signal from said memory means at a second predetermined rate in which one of said first and second predetermined rates is faster than the other, said memory means having a data storage capacity smaller than an amount of data of one frame but larger than an amount of data of one field; and controlling the order in which the fields of said field video signal are read from said memory means so as to arrange the fields in a desired order.

4. The video signal processing method according to claim 3, wherein said first predetermined rate is approximately one-half that of said second predetermined rate and has a value such that one field of data is written into said memory means in a time associated with one frame and wherein said memory means includes a first memory area having a data storage capacity capable of storing the data of approximately ⅓ of one field and a second memory area having a data storage capacity capable of storing the data of approximately one field.

5. The video signal processing method according to claim 4, wherein each video frame of said frame video signal includes a first field and a second field and wherein a portion of the first field of a respective video frame is stored in said second memory area of said memory means and a portion of the second field of the respective video frame is stored in said second memory area after the video signal corresponding to the first field is read out.

6. The video signal processing method according to claim 4, wherein each video frame of said frame video signal includes a first field and a second field and wherein a portion of the first field is stored in said first memory area of said memory means and another portion of the first field is stored at a different time in said second memory area of said memory means, and a portion of the second field is stored in the second memory area after the stored portion of the first field is read out therefrom.

7. The video signal processing method according to claim 3, further comprising the step of filtering the field video signal read from said memory means by vertical filter means having a coefficient selectively set in accordance with the field order.

8. A video signal processing method for converting a frame video signal representing a plurality of video frames into a field video signal representing a plurality of video fields, said method comprising the steps of:

storing said frame video signal in memory means and reading out the stored video signal therefrom as the field video signal;

controlling the order in which the fields of said field video signal are read from said memory means so as to arrange the fields in a desired order; and filtering the field video signal read from said memory means by vertical filter means having a coefficient selectively set in accordance with the field order, wherein the coefficient of said vertical filter means is set such that a centroid of a picture corresponding to the field video signal is shifted vertically by an amount corresponding to n/8 of an interval between adjacent horizontal lines (where n is an integer).

* * * * *